(12) United States Patent
Demers (10) Patent No.: US 9,239,264 B1
(45) Date of Patent: Jan. 19, 2016

(54) TRANSCEIVER METHOD AND APPARATUS HAVING PHASE MODULATION AND COMMON MODE PHASE DRIFT REJECTION

(71) Applicant: Joseph R. Demers, Pasadena, CA (US)

(72) Inventor: Joseph R. Demers, Pasadena, CA (US)

(73) Assignee: Joseph R. Demers, Pasadena, CA (US)

( * ) Notice: Subject to any disclaimer, the term of this patent is extended or adjusted under 35 U.S.C. 154(b) by 0 days.

(21) Appl. No.: 14/490,411

(22) Filed: Sep. 18, 2014

(51) Int. Cl.
*G01N 21/35* (2014.01)
*G01J 3/45* (2006.01)
*G01J 3/10* (2006.01)

(52) U.S. Cl.
CPC ... *G01J 3/45* (2013.01); *G01J 3/108* (2013.01)

(58) Field of Classification Search
CPC ... G01N 21/3581; G01N 21/3586; G01J 3/42; G01J 3/10; G01J 3/02; G01J 5/02
See application file for complete search history.

(56) References Cited

U.S. PATENT DOCUMENTS

| | | |
|---|---|---|
| 4,594,511 A | 6/1986 | Cooper et al. |
| 5,379,110 A | 1/1995 | Matsui et al. |
| 5,379,309 A | 1/1995 | Logan, Jr. |
| 5,623,145 A | 4/1997 | Nuss |
| 6,304,219 B1 | 10/2001 | Rothe et al. |
| 6,348,683 B1 | 2/2002 | Verghese et al. |
| 6,434,496 B1 | 8/2002 | Dong et al. |
| 6,545,785 B1 | 4/2003 | Heflinger et al. |
| 6,811,552 B2 | 11/2004 | Weil, Sr. et al. |
| 6,816,647 B1 | 11/2004 | Rudd et al. |
| 6,828,558 B1 | 12/2004 | Arnone et al. |
| 6,844,552 B2 | 1/2005 | Zhang et al. |
| 6,849,852 B2 | 2/2005 | Williamson |
| 6,865,014 B2 | 3/2005 | Ciesla et al. |
| 6,957,099 B1 | 10/2005 | Arnone et al. |
| 7,126,078 B2 | 10/2006 | Demers et al. |
| 7,174,037 B2 | 2/2007 | Arnone et al. |
| 7,244,934 B2 | 7/2007 | Arnone et al. |
| 7,291,835 B2 | 11/2007 | Overney |
| 7,291,839 B1 | 11/2007 | Demers et al. |
| 7,335,883 B2 | 2/2008 | Wallace et al. |
| 7,439,511 B2 | 10/2008 | Demers |
| 7,485,863 B2 | 2/2009 | Cole |
| 7,535,005 B2 | 5/2009 | Demers |
| 7,781,736 B2 | 8/2010 | Logan, Jr. et al. |
| 7,804,069 B2 | 9/2010 | Tribe |
| 7,936,453 B2 | 5/2011 | Logan, Jr. et al. |
| 7,963,571 B2 | 6/2011 | Martin |

(Continued)

FOREIGN PATENT DOCUMENTS

| | | |
|---|---|---|
| EP | 1 233 527 A1 | 8/2002 |
| GB | 2 381 121 A | 4/2003 |

(Continued)

OTHER PUBLICATIONS

Arnone et al., "Applications of Terahertz (THz) Technology to Medical Imaging," *Proc. SPIE Terahertz Spectroscopy Applicat. II*, 1999; 3823:209-219.

(Continued)

*Primary Examiner* — Marcus Taningco
(74) *Attorney, Agent, or Firm* — Pritzkau Patent Group, LLC (57) ABSTRACT

Highly advantageous transceiver systems with common mode phase drift rejection and associated methods are disclosed which utilize certain phase modulators in configurations that reduce or eliminate inconsistent interference patterns caused by phase modulator phase drift.

34 Claims, 8 Drawing Sheets

(56) References Cited

U.S. PATENT DOCUMENTS

| | | | |
|---|---|---|---|
| 8,138,477 B2 | 3/2012 | Gregory | |
| 8,604,433 B2 | 12/2013 | Logan, Jr. et al. | |
| 8,829,440 B2 | 9/2014 | Logan, Jr. et al. | |
| 9,029,775 B2 * | 5/2015 | Demers et al. | 250/339.07 |
| 9,103,715 B1 * | 8/2015 | Demers et al. | |
| 2003/0155512 A1 | 8/2003 | Arnone et al. | |
| 2004/0065831 A1 | 4/2004 | Federici et al. | |
| 2005/0162658 A1 | 7/2005 | Pepper | |
| 2006/0084180 A1 | 4/2006 | Paldus et al. | |
| 2006/0214107 A1 | 9/2006 | Mueller | |
| 2006/0255277 A1 | 11/2006 | Cole et al. | |
| 2008/0179519 A1 | 7/2008 | Andonian et al. | |
| 2008/0179528 A1 | 7/2008 | Demers | |
| 2008/0212974 A1 | 9/2008 | Davies et al. | |
| 2008/0251720 A1 | 10/2008 | Xu et al. | |
| 2009/0015843 A1 | 1/2009 | Demers et al. | |
| 2009/0065696 A1 * | 3/2009 | Mann et al. | 250/339.06 |
| 2009/0066948 A1 | 3/2009 | Karpowicz et al. | |
| 2009/0091820 A1 | 4/2009 | McCarthy et al. | |
| 2009/0180122 A1 | 7/2009 | Federici | |
| 2009/0200472 A1 | 8/2009 | Gregory | |
| 2009/0283680 A1 | 11/2009 | Logan, Jr. et al. | |
| 2010/0080505 A1 | 4/2010 | Sartorius et al. | |
| 2010/0092183 A1 | 4/2010 | Kim et al. | |
| 2010/0171835 A1 | 7/2010 | Kasai et al. | |
| 2010/0276594 A1 * | 11/2010 | Rafailov et al. | 250/338.4 |
| 2011/0032955 A1 | 2/2011 | Daiber | |
| 2011/0068268 A1 | 3/2011 | Heidari | |
| 2012/0075477 A1 | 3/2012 | Daly et al. | |
| 2012/0326039 A1 | 12/2012 | Demers et al. | |
| 2013/0200263 A1 | 8/2013 | Logan et al. | |
| 2014/0021351 A1 | 1/2014 | Logan et al. | |
| 2014/0043612 A1 | 2/2014 | Logan, Jr. et al. | |

FOREIGN PATENT DOCUMENTS

| | | |
|---|---|---|
| GB | 2 483 118 A | 2/2012 |
| WO | WO 2007/135382 A2 | 11/2007 |
| WO | WO 2009/082820 A1 | 7/2009 |
| WO | WO 2009/137263 A2 | 11/2009 |
| WO | WO 2009/137263 A3 | 1/2010 |

OTHER PUBLICATIONS

Arnone et al., "Terahertz Imaging Comes Into View," *Phys. World*, 2000; pp. 35-40.

Bartels et al., "Femtosecond Time-Resolved Optical Pump-Probe Spectroscopy at Kilo Rates Over Nanosecond-Time-Delays Without Mechanical Delay Line," *Appl. Phys. Lett.*, 2006; 88:04117.

Bartels et al., "High-Resolution THz Spectrometer with kHz Scan Rates," *Optics Express*, 2006; *14*(1):430-437.

Bjanason et al., "ErAs:GaAs Photomixer with two decades tenability and 12 μW Peak Output," *Applied Physics Letters*, 2004; 85(18):3983-3985.

Brown et al., "Characterization of a Planar Self-Complementary Square-Spiral Antenna in the THz Region," *Microwave and Optical Technology Letters*, Mar. 2006; 48(3):524-529.

Brown, "Advancements in Photomixing and Photoconductive Switching for THz Spectroscopy and Imaging," *Proc. of SPIE*, 2013; 7938:793802-1-793802-16.

Chang et al., "Power Scalable Compact THz System Based on an Ultrafast Yb-doped Fiber Amplifier," *Optics Express*, 2006; 14(17):7909-7913.

Chen et al., "Spectroscopic Applications and Frequency Locking of THz Photomixing with Distributed-Bragg-Reflector Diode Lasers in Low-Temperature-Grown GaAs," *Appl. Phys. Lett.*, 1997; 71(12):1601-1603.

Combined Search and Examination Report for Application No. GB1309663.1 dated Nov. 13, 2013; 8 pgs.

Demers et al., "An Optically Integrated Coherent Frequency-Domain THz Spectrometer with Signal-to-Noise Ratio up to 80 dB," 2007 IEEE Conference; pp. 92-95.

Demers et al., "Field-portable THz Spectrometer for Characterization of Explosives and Chemicals," IEEE IRMMW Conference, Houston, TX, Oct. 6, 2011; 26 pgs.

Gutierrez, "An Electro-Optical Frequency Shifter," NASA's Jet Propulsion Laboratory, 2000; Available at <URL:http://www.nasatech.com/Briefs/Sept00/NPO20531.html>.

Hu et al., "Imaging with Terahertz Waves," *Optics Letters*, 1995; 20(16):1716-1718.

Hunsche et al., "Terahertz 'T-Ray' Tomography," *Proc. SPIE Int. Millimeter Submillimeter Waves Applicat. IV.*, 1998; 50(3):426-433.

Intellectual Property Office Search Report for Application No. GB10170462 dated Nov. 16, 2010; 1 page.

Izutsu et al., "Integrated Optical SSB Modulator/Frequency Shifter," *IEEE Journal of Quantum Electronics*, Nov. 1981, QE-17:2225-2227.

Janke et al., "Asynchronous Optical Sampling for High-Speed Characterization of Integrated Resonant Terahertz Sensors," *Optics Letters*, 2005; 30(11):1405-1407.

Jiang et al., "Terahertz Imaging via Eletrooptic Effect," *IEEE Trans. Microwave Theory Tech.*, 1999; 47:2644-2650.

Logan, Jr. et al., "Field Portable THz Spectrometer for Characterization of Explosives and Chemicals," Emcore Corporation Conference Publication, Oct. 2011; 3 pgs.

McGrath et al., "Superconductive Hot Electron Mixers with Ultra Wide RF Bandwidth for Heterodyne Receiver Applications Up to 3 THz," *Proceedings of the ESA Symposium*, 1997; pp. 401-404.

McIntosh et al., "Terahertz Measurements of Resonant Planar Antennas Coupled to Low-Temperature-Grown GaAs Photomixers," *Appl. Phys. Lett.*, 1996; 69(24):3632-3634.

Mittleman et al., "T-Ray Imaging," *IEEE J. Select. Topics Quantum Electron*, 1996; 2:679-692.

Saleh et al., "Fundamentals of Photonics," Wiley-Interscience, 1991; pp. 719-720, 823-825.

Siegel, "Terahertz Technology," *IEEE Transactions on Microwave Theory and Techniques*, 2002; 50(3):915-917.

Verghese et al., "Generation and Detection of Coherent Terahertz Waves Using Two Photomixers," *Applied Physics Letters*, 1998; 73(26):3824-3826.

Wu et al., "Two-Dimensional Electro-Optic Imaging of THz Beams," *Appl. Phys. Lett.*, 1996; 69(8):1026-1028.

Yasui et al., "Terahertz Frequency Comb by Multifrequency-Heterodyning Photoconductive Detection for High-Accuracy, High Resolution Terahertz Spectroscopy," *Applied Physics Letters*, 2006; 88(241104):1-3.

\* cited by examiner

TRANSCEIVER METHOD AND APPARATUS HAVING PHASE MODULATION AND COMMON MODE PHASE DRIFT REJECTION

REFERENCE TO RELATED APPLICATIONS

This application may be related to U.S. patent application Ser. No. 12/465,219 filed May 13, 2009, now U.S. Pat. No. 7,781,736; Ser. No. 12/861,651 filed Aug. 23, 2010 now U.S. Pat. No. 8,604,433, and Ser. No. 13/831,438, filed Mar. 14, 2013, now U.S. Pat. No. 8,829,440; and co-pending U.S. patent application Ser. No. 13/565,021 filed Aug. 2, 2012; Ser. No. 14/212,542 filed Mar. 14, 2014; Ser. No. 14/262,291 filed Apr. 25, 2014; and Ser. No. 14/515,852 filed Oct. 16, 2014.

The present invention is related to transceivers for transmitting and receiving high frequency radiation and, more particularly, to an advanced apparatus, system and methods for common mode phase drift rejection in transceivers employing a phase modulator.

High frequency transceivers can be used for real time spectroscopy, imaging, communications and other applications. High frequency transceivers can utilize photoconductive switches and light sources to generate signals in frequencies ranging from tens of MHz to tens of THz. The light sources can be frequency tunable lasers such as Distributed Feedback Lasers (DFB) which have a light output frequency that can be controlled using temperature. The high frequency can be created by generating two lights at frequencies that are different from one another and applying the two lights to a source photoconductive switch. The same two lights can be applied to a detector photoconductive switch to homodyne detect the high frequency created by the source photoconductor.

High frequency electromagnetic radiation in the sub-millimeter and terahertz (THz) frequency ranges has been employed for characterizing molecular gases, including materials of atmospheric importance. Recently terahertz radiation has been utilized for the characterization and/or detection of solids as well as gases. Many different materials have distinct and measurable characteristic signatures in the terahertz frequency range. For example, these materials can absorb electromagnetic radiation at certain terahertz frequencies that are unique for a given material or materials and which can be used to identify the given material. Materials that exhibit these characteristics signatures include: illicit drugs, biologically important compounds such as sugars and hormones, and explosives. Terahertz radiation can also be used in the field of art conservation, for example, to determine the proper materials for restoring paintings.

Many dielectric, nonmetallic materials are transparent at terahertz frequencies which makes it is possible to measure or detect other materials that are hidden behind such terahertz transparent materials. Some examples of terahertz transparent materials include: fabrics, packaging materials, and paper. Also, in the case of art characterization, layers of paint are also transparent to terahertz frequency radiation. Nonpolar liquids are also transparent to terahertz radiation.

In addition, terahertz radiation is non-ionizing and is completely eye safe. Because of this, terahertz radiation can be used in public areas without the risk of harm to humans, flora, or fauna. This can be especially beneficial because people using the terahertz frequency radiation are not encumbered by unwieldy radiation protection such as is common, for example, when using x-rays.

The foregoing examples of the related art and limitations related therewith are intended to be illustrative and not exclusive. Other limitations of the related art will become apparent to those of skill in the art upon reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In general, methods and associated apparatus are described for common mode rejection of phase drift in transceivers having phase modulators. In an embodiment, a first light is generated at a first frequency and a second light is generated at a second frequency such that the first frequency and second frequency are different from one another by a difference frequency. The first light is passed through the phase modulator to produce a phase modulator first light and a phase modulator second light. The phase modulator introduces a phase drift into the phase modulator lights. The phase modulator first light and the second light are mixed at a source photoconductive switch to produce a difference frequency signal at the difference frequency. The difference frequency signal is transmitted from the source photoconductive switch and the difference frequency signal is received with a detector photoconductive switch. The phase modulator second light and the second light are mixed at the detector photoconductive switch to produce a local oscillation in the detector photoconductive switch at the difference frequency. The detector photoconductive switch produces a detector signal in response to the received difference frequency signal and the local oscillation. Mixing the phase modulator first light having the phase drift at the source photoconductive switch with the second light and the phase modulator second light having the phase drift with the second light at the detector photoconductive switch produces the detector signal such that the phase drift is common mode rejected.

In another embodiment, a transceiver is disclosed which includes a first light source for generating a first light at a first frequency and a second light source for generating a second light at a second frequency such that the second frequency is different from the first frequency by a difference frequency. A phase modulator is configured to receive the first light and to produce a phase modulator first light and a phase modulator second light. The phase modulator introduces a phase drift into each of the phase modulator first light and the phase modulator second light. A source photoconductive switch is arranged to receive the phase modulator first light and the second light to produce and transmit a difference frequency signal having a frequency at the difference frequency. A detector photoconductive switch is arranged to receive the phase modulator second light and the second light to produce a local oscillation at the difference frequency. The detector photoconductive switch is also arranged to receive the difference frequency signal and to produce a detector signal in response to the received difference frequency signal and the local oscillation such that the difference frequency signal and the local oscillation include the phase drift to common mode reject the phase drift from the detector signal In yet another embodiment, a terahertz frequency spectrometer is disclosed for performing spectroscopy on a sample in a sampling area. The spectrometer includes a first laser light source configured for generating a first laser light at a first frequency and a second laser light source configured for generating a second laser light at a second frequency. The first and second laser lights are generated such that the first frequency and second frequency are different from one another by a difference frequency. A phase modulator is configured for receiving the first laser light from the first laser light source and for producing a phase modulated laser light, that is phase modulated, and a phase modulator laser light, that is not phase modulated. The phase modulator introduces a phase drift component into the phase modulated light and the phase modulator light. A source photoconductive switch is configured for receiving the phase modulated laser light and the second laser light to produce a beam of electromagnetic energy at the difference frequency in a direction toward the sample area. A detector photoconductive switch is arranged for receiving the phase modulator laser light and the second laser light to produce a local oscillation at the difference frequency in response thereto. The detector photoconductive switch is also arranged to receive at least a portion of the electromagnetic energy from the sample area as influenced by the sample and to produce a received signal that is related to the received electromagnetic energy. The detector photoconductive switch is also arranged to mix the local oscillation and the received signal to produce a detector signal that is related to the difference between the local oscillation and the received signal and which includes information related to the sample. The phase drift component is present in the local oscillation and the received signal and the phase drift is at least partially removed by common mode rejection when the local oscillation and the received signal are mixed to produce the detector signal.

In still another embodiment, a method is disclosed for increasing consistency of photo-mixing interference patterns in a transceiver system. In the method, a first light is generated at a first frequency and a second light is generated at a second frequency such that the first frequency and second frequency are different from one another by a difference frequency. The phase of the first light is modulated relative to the second light using a phase modulator to produce a phase modulated first light, the phase modulator introducing a phase drift into the phase modulated first light. The first light is also passed through the phase modulator to produce a phase modulator first light without phase modulation, the phase modulator also introducing the phase drift into the phase modulator first light. The phase modulated first light and the second light are photo-mixed and a difference frequency signal at the difference frequency is generated based at least in part on the photo-mixing. The difference frequency signal is transmitted. The difference frequency signal is received and a received signal is generated in response. The phase modulator first light and the second light are photo-mixed to generate a detection oscillation. The received signal and the detection oscillation are mixed to generate a detector signal. The detector signal includes an interference pattern resulting from photo-mixing, and the mixing of the received signal and the detection oscillation common mode reject the phase drift introduced by the phase modulator.

In addition to the exemplary aspects and embodiments described above, further aspects and embodiments will become apparent by reference to the drawings and by study of the following descriptions.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiments shown, but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology may be adopted for purposes of enhancing the reader's understanding, with respect to the various views provided in the Figures, and is in no way intended as being limiting.

Figure 1:
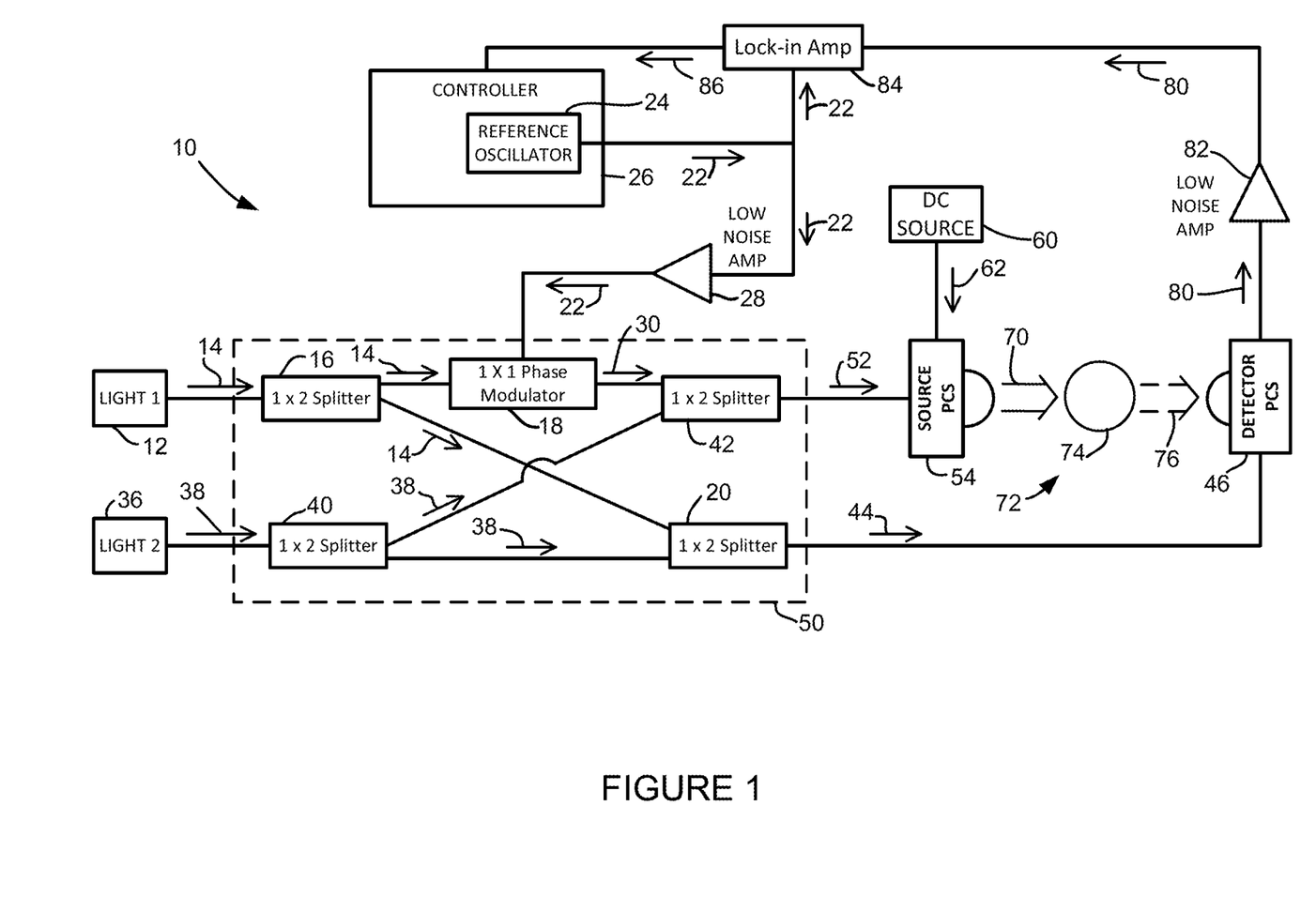
FIG. 1 is a block diagram illustrating an embodiment of a transceiver system without common mode phase drift rejection.

Attention is now directed to the Figures wherein like items may refer to like components throughout the various views. FIG. 1 is a diagrammatic representation of a simplified transceiver system 10 which can be employed for terahertz radiation production and detection in a spectrometer. Transceiver system 10 has been presented for purposes of providing a framework for the discussion of Applicant's recognitions in the context of problems which can arise in transceivers utilizing phase modulators.

Transceiver system 10 includes a first light source 12 that produces a first light 14 which is optically coupled to a 1×2 optical splitter 16. Optical splitter 16 splits first light 14 and supplies the first light to a 1×1 phase modulator 18 and a 1×2 splitter 20. The phase modulator is connected to receive an oscillator signal 22 from a reference oscillator 24 which can produce the oscillator signal at a modulation frequency under the control of a controller 26. A low noise amplifier 28 amplifies the oscillator signal from the reference oscillator and supplies the amplified oscillator signal to the phase modulator. The phase modulator is configured to receive the oscillator signal and to modulate the phase of first light 14 at the modulation frequency in response to the oscillator signal. The phase modulator produces a phase modulated first light 30.

Transceiver system 10 also includes a second light source 36 that produces a second light 38 at a frequency that is different than the frequency of first laser light 14 by a difference frequency. Although not specifically shown, the first and/or second laser can be controlled by controller 26 to produce the difference frequency at a selected frequency within a range at a given time. Second light 38 is optically coupled to a 1×2 splitter 40 which splits second light 38 and supplies the light to a 1×2 splitter 42 and 1×2 splitter 20. Splitter 20 combines first light 14 and second light 38 to produce a combined light 44 which is supplied to a detector photoconductive switch (PCS) 46. Splitters 16, 20, 40, 42, phase modulator 18, and the various light guides to optically couple these devices can be referred to as an optical circuit 50. Optical splitter 42 receives laser light 38 and phase modulated first light 28 and combines them into a combined light 52 which is supplied to a source PCS 54.

A DC driver 60, which can be controlled by controller 26, produces a driver signal 62 which is supplied to source PCS 54 for biasing an antenna (not shown). The source PCS receives the combined light 52 and driver signal 62 and produces a difference frequency signal 70 that is phase modulated at the modulation frequency. The difference frequency signal can be in the form of a beam of radiation. The difference frequency signal has a frequency that is equal to the difference frequency between modulated first light 28 and second light 38. The difference frequency signal radiation beam is transmitted toward the detector PCS through a sample area 72 in which a sample 74 can be placed for analysis.

At least a portion of the difference frequency signal radiation beam passes through or otherwise interacts with the sample in the sample area or with the atmosphere if no sample is in the sample area. The sample can modify the beam by absorption, reflection and/or scattering in a manner that is related to the type of material of the sample and which is determinable by the radiation beam reaching the detector. The radiation beam reaching detector PCS 46 is a modified difference frequency signal 76 since the beam now includes information related to the sample. The detector PCS includes an antenna (not shown) that receives the modified difference frequency signal. The modified difference frequency signal creates a detector antenna signal in the detector PCS antenna. Combined light 44 produces an oscillation in the detector PCS at a frequency that is the difference between the frequencies of the first and second lights and which can be referred to as a local oscillation. The local oscillation can be an oscillation of conductance.

Detector PCS 46 mixes the local oscillation and the detector antenna signal to produce a detector signal 80 at the difference between the frequency of the local oscillation and the frequency of the modified antenna signal. The detector signal includes a modified signal component related to the sample and a modulation frequency component related to the modulation frequency produced by reference oscillator 24. An amplifier 82 amplifies detector signal 80 to produce an amplified version of the detector signal which is passed to a lock-in amplifier 84. Lock-in amplifier 84 receives reference oscillator signal 22 from the reference oscillator and uses the reference oscillator signal, which is the same frequency as the modulation frequency component of the detector signal, to detect the modified signal component from the detector signal. Lock-in amplifier 84 produces a data signal 86 which can be passed to controller 26. Controller 26 can process the data signal in various ways and can use the data signal to produce a plot of the power over a range of different frequencies.

Transceiver system 10 can scan the sample area with the difference frequency radiation beam using a range of different terahertz frequencies. The terahertz frequency can be swept through the range or one or more discrete frequencies can be used. The transceiver system can scan the sample area without a sample in the sample area to obtain information about the background spectrum of the system. The background spectrum information can include information that may influence the scan of a sample but which does not provide useful information about the sample. The system can make several background spectrum scans which can be used together to provide more accurate information about the background spectrum. The scans can be averaged for this purpose. The transceiver system can also be used for scanning the sample multiple times and the multiple scans can be used to obtain more accurate information about the sample. The background spectrum information can be removed from the scan of the sample to increase the accuracy of the sample scan.

Applicant recognizes that the phase modulator can introduce an unwanted phase drift into light passing through the phase modulator. The phase drift is introduced into the light passing through the phase modulator whether or not the phase of the light passing through the phase modulator is modulated. The phase drift is a drift in the bias point of the phase modulator which changes the relative phase between the received signal and the local oscillation for different scans and/or during a single scan. Phase drift can result from temperature changes and/or vibrations in the phase modulator. Applicant further recognizes that the phase drift can produce different photo-mixing interference patterns that are not repeatable, and that in order to perform averaging over many scans, the interference pattern must remain consistent. Applicant recognizes that, without addressing the phase shift introduced by the phase modulator, the interference patterns can be inconsistent and so multiple scans cannot be used since the interference pattern changes each time. Transceiver 10 is shown as an example of a transceiver that utilizes a phase modulator but which does not address phase drift introduced by the phase modulator. Accordingly, transceiver 10 provides relatively poor performance in multiple scan situations.

Figure 2:
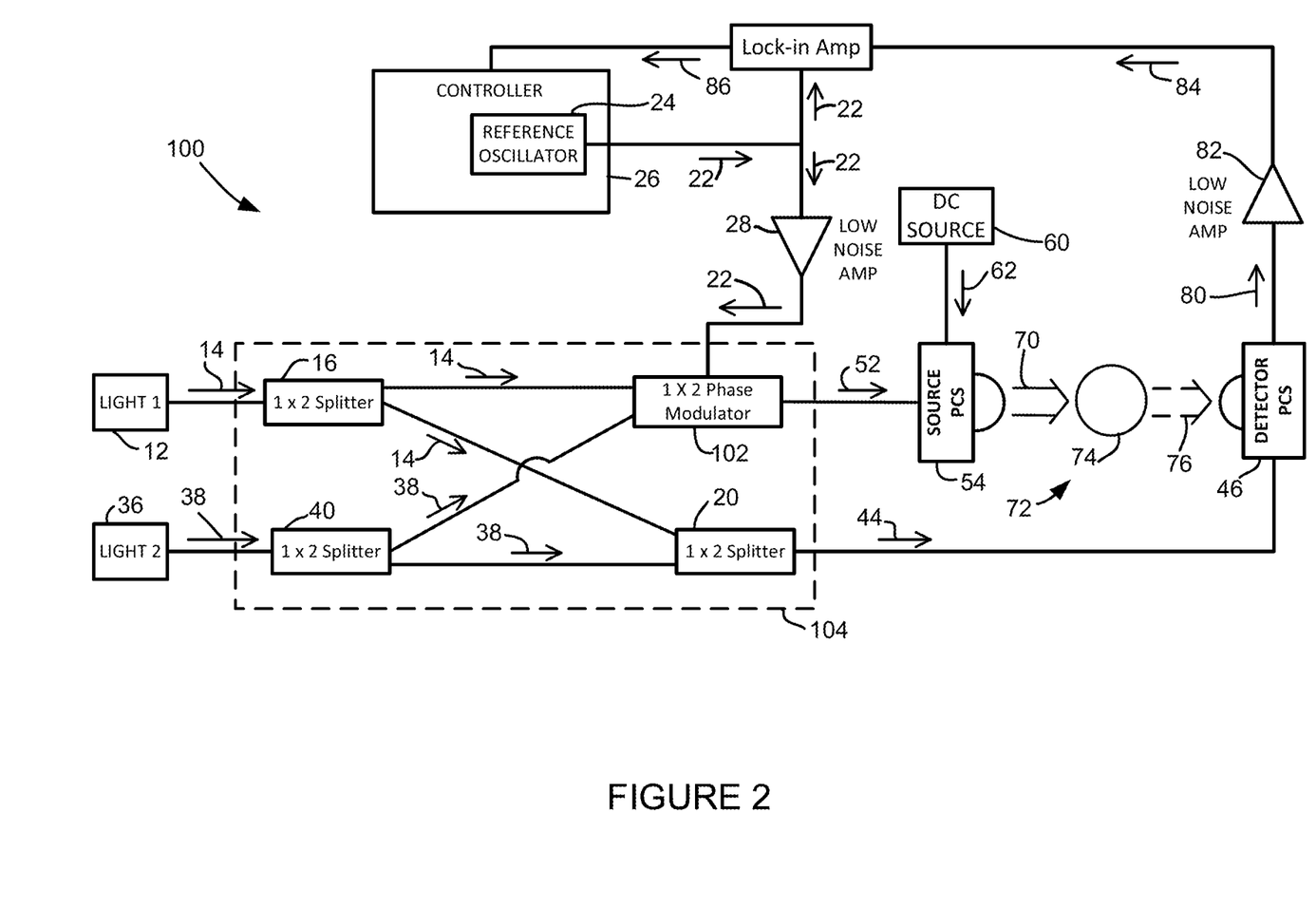
FIG. 2 is a block diagram illustrating another embodiment of a transceiver system without common mode phase drift rejection.

Referring now to FIG. 2 in conjunction with FIG. 1, another embodiment of a transceiver system is shown which in which unwanted phase drift is introduced but is not addressed. Transceiver system 100 can include many of the same components as transceiver system 10 and these like components are referred to using like reference numbers. Transceiver system 100 includes a 1×2 phase modulator 102 in place of 1×1 phase modulator 18 and 1×2 splitter 42 shown in FIG. 1. Also, an optical circuit 104 (FIG. 2) is slightly different than optical circuit 50 (FIG. 1) based on the use of 1×2 phase modulator 102.

Phase modulator 102 receives first light 14 and second light 38 from splitters 16 and 40, respectively. Phase modulator 102 modulates the phase of one of the first or second laser lights relative to the other to produce a combined light that can be the same as combined laser light 52 produced by transceiver system 10. In both transceiver system 10 and transceiver system 100, the unwanted phase drift created by the phase modulators is introduced into the system such that difference frequency signal 70, modified difference frequency signal 76 and the detector antenna signal in the detector PCS resulting from the modified difference frequency signal all include the phase drift while the local oscillation in the detector PCS does not.

Figure 3:
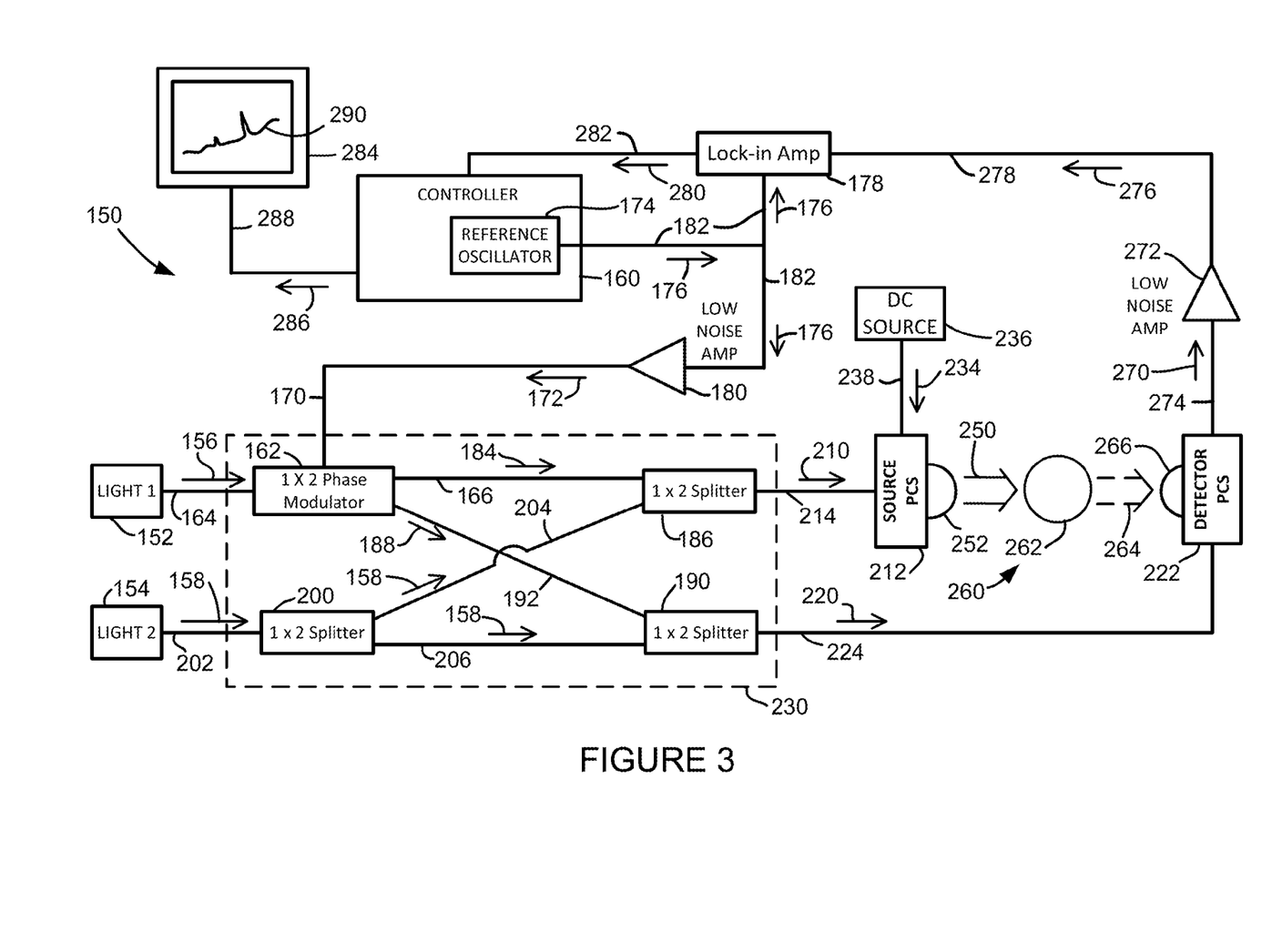
FIG. 3 is a diagrammatic illustration of an embodiment of a transceiver system with a common mode phase drift rejection configuration in accordance with the present disclosure.

Referring now to FIG. 3, an improved transceiver system 150 is shown in which phase drift is managed such that scans can be repeated with minimal or no negative impact from phase drift. Transceiver 150 is configured as a spectrometer, however the principles discussed for addressing phase drift can be applied to other types of transceivers as well, such as transceivers arranged for imaging and communications.

Transceiver system 150 includes a first light source 152 and a second light source 154. The first and second light sources can be semiconductor diode lasers, such as distributed feedback (DFB) lasers, that each produce laser light at a different single frequency from one another at any given time. The first light source can generate a first light 156 and a second light source can generate a second light 158. The frequency of the light from either one or both of the light sources can be controlled using a controller 160, and the difference between the light frequencies can be in the terahertz frequency range when used as the spectrometer shown. A range of terahertz frequencies can be produced over a time period by changing the difference between the light frequencies over the time period.

Transceiver system 150 includes a phase modulator 162 which is configured to receive first light 156 through a waveguide 164 that is optically connected to an input of the phase modulator. Phase modulator 162 is a 1×2 phase modulator that includes the optical input connected to waveguide 164 and two optical outputs which are connected to waveguides 166 and 168. Phase modulator 162 also includes a control input which is electrically connected to a control line 170 for receiving a phase modulator control signal 172.

A reference oscillator 174 generates oscillator signal 176 at a low frequency and supplies the signal to a lock-in amplifier 178 and a low noise amplifier 180 through a reference oscillator conductor 182. The low frequency oscillator signal can have a frequency of a few kilohertz to a few megahertz. The reference oscillator can originate the oscillator signal as a square wave and the reference oscillator can include a waveform shaping circuit that converts the square wave into either a triangle wave or a sine wave that has slower transitions between maximum and minimum values than the square wave. The reference oscillator can adjust the amplitude of the oscillator signal and the reference oscillator can also be configured to generate any other suitable waveform. Low noise amplifier 180 receives the oscillator signal and amplifies the oscillator signal to produce phase modulator control signal 172 which the low noise amplifier supplies to phase modulator 162 over control line 170. The oscillator signal controls the phase modulator to modulate the phase of first light 156 at a modulation frequency equal to the frequency of the oscillator signal. The frequency of the phase modulation is controlled by the frequency of the oscillator signal and the degree of phase change during each oscillation is controlled by the amplitude of the phase modulator control signal. In a communication transceiver application, the phase modulator control signal can include a data stream.

Phase modulator 162 can produce a phase modulated first light 184 from light 156 and can supply the phase modulated first light to a 1×2 splitter 186 through waveguide 166. Phase modulator 162 can also produce a phase modulator first light 188 from light 156 and can supply the phase modulator first light to a 1×2 splitter 190 through a waveguide 192. Phase modulator 162 introduces an unwanted phase drift into all of the light that passes through the phase modulator, regardless of whether the phase modulator modulates the phase of the light or passes the light through without modulation. Light passing through the phase modulator, either modulated or unmodulated, can be referred to as phase modulator light. Phase modulator light that is modulated by the phase modulator can be referred to as phase modulated light. The phase modulator can modulate the phase of the light using different waveforms having different frequencies and amplitudes; can modulate the phase of the light using a data stream or other type of information related signal; and/or can introduce a set phase offset between lights.

Phase modulated first light 184 is phase modulated by the phase modulator and includes the unwanted phase drift. Phase modulator first light 188 is produced by the phase modulator but is not phase modulated by the phase modulator. Phase modulator first light 188 also includes the unwanted phase drift. Transceiver system 150 addresses the phase drift in a way which minimizes or eliminates the negative impact of the phase drift, as will be discussed in further detail.

Second light 158 is supplied to a 1×2 splitter 200 over a waveguide 202. Splitter 200 receives the second light and splits the second light into two approximately equal portions. Splitter 200 supplies the second light to splitters 186 and 190 over waveguides 204 and 206, respectively. Splitter 186 receives phase modulated first light 184 and second light 158 and combines these lights into a combined laser light 210 which contains both the phase modulated first light and the second light. Splitter 186 supplies combined light 210 to a source PCS 212 over a waveguide 214. Splitter 190 receives phase modulator first light 188 and second light 158 and combines these lights into a combined laser light 220 which contains both the unmodulated phase modulator first light and the second light. Splitter 190 supplies combined light 220 to a detector PCS 222 over a waveguide 224. First and second lights 152 and 154; phase modulator 162; splitters 186, 190, and 200; along with the various waveguides can be referred to in combination as optical circuit 230.

Source PCS 212 receives a DC bias driver signal 234 from a DC driver 236 over a driver conductor 238. The source PCS utilizes the driver signal to bias a source PCS antenna which can be a spiral antenna (not specifically shown). Combined light 210, received by the source PCS, creates a beat pattern which produces a combined optical amplitude that varies at a rate given by the difference between the two optical frequencies in the combined light. This varying optical amplitude causes a resistance of the source PCS to vary at the difference frequency rate and the bias on the source PCS antenna causes a corresponding current signal through the varying resistance. Since the difference frequency is in the terahertz range, the current signal is also in the terahertz range and the terahertz current signal from the source PCS flows through the source PCS antenna. In response, the source PCS antenna generates a difference frequency signal, which in this embodiment is terahertz electromagnetic radiation 250. The source PCS can focus the electromagnetic radiation into a beam using terahertz optics 252. The phase of the electromagnetic radiation beam depends upon the relative phase of the phase modulated light and the second light in combined light 210 at a point where the photoconductive switch of the source PCS is illuminated. Therefore, the phase offset between the phase modulated first light and the second light is carried through to electromagnetic radiation beam 250.

Electromagnetic radiation beam 250 is directed toward detector PCS 222 through a sampling area 260 in which a sample 262 can be placed for analysis. The beam interacts with whatever is in the sampling area and a modified difference frequency signal is produced, which in this embodiment is a modified electromagnetic radiation beam 264. Modified electromagnetic radiation beam 264 includes terahertz frequency spectral information that is related to whatever is in the sampling area. For example, as the electromagnetic radiation beam is swept through a range of terahertz frequencies, certain terahertz frequencies, depending on the type of material in the sample, can be absorbed by the material to some extent. Other terahertz frequencies of terahertz radiation beam 250, which are not absorbed by the material or are only partially absorbed, can pass through the material from the source PCS to the detector PCS. These terahertz frequencies can exhibit spectral information which can be used for identifying a compound material and/or materials in the compound material. If, for example, nothing is placed in sampling area 260 then modified terahertz radiation beam 264 can include terahertz frequency spectral information related to background spectrum noise in the system.

Detector PCS 222 receives combined light 220 from splitter 190 and creates a beat pattern in the detector PCS. The beat pattern produces a local oscillation in conductance in the detector PCS at the frequency difference between the frequencies of the unmodulated phase modulator first light and the second light. The local oscillation can serve as a homodyne local oscillator that oscillates at the same frequency as the resistance in the source PCS. It should be noted that the source PCS receives the combined light that includes the phase modulated first light which includes the phase drift, and the detector PCS receives the combined light that includes the unmodulated phase modulator first light which also includes the phase drift.

Detector PCS 222 includes terahertz optics 266 which focus modified electromagnetic radiation beam 264 onto a spiral antenna (not shown) of the detector PCS. The detector PCS antenna can receive the modified radiation beam and produce a modified voltage signal across the varying local oscillation conductance in the detector PCS. The modified voltage signal across the varying conductance produces a detector signal 270 that is the product of the modified voltage signal and the local oscillation conductance. Because the conductance is modulated by the optical field of the unmodulated phase modulator first light and second laser light illuminating the detector switch, and the modified radiation beam is generated using the phase modulated first light and second light, the result is a homodyne mixing. The homodyne mixing of the locally generated oscillation in the detector and the modified voltage signal eliminates the terahertz frequencies to produce the detector signal. The detector signal contains a frequency component at the phase modulation frequency and a modified signal component related to the sample.

Detector signal 270 is carried to a low noise amplifier 272 over a detector signal conductor 274. Low noise amplifier 272 amplifies the detector signal and produces an amplified detector signal 276 which is carried to lock-in amplifier 178 over a detector signal conductor 278. Lock-in amplifier 178 uses the oscillator signal 176 to detect the modified signal component from the amplified detector signal to produce a data signal 280 which can be passed to controller 174 over a data signal conductor 282. Controller 160 can process the data signal in various ways and can use the data signal to produce a plot of power over a range of different terahertz frequencies. Transceiver system 150 can include a display device 284 which can receive display signals 286 from controller 160 over a display signal conductor 288 and can produce a graph 290 with results of one or more scans of samples. Transceiver system 150 can produce information for analysis of the sample and other forms of information as well, as would be well understood by a person of ordinary skill in the art.

Transceiver system 150 utilizes a 1×2 phase modulator in a way which addresses and substantially overcomes the issues related to phase drift. Applicant recognizes that the 1×1 phase modulators utilized in transceiver system 10 (FIG. 1) and transceiver system 100 (FIG. 2) were introducing the phase drift into the system only on the source PCS. Since the phase drift in these systems was only present on the source PCS, the source and detector PCSs were not receiving the same signals and therefore the mixing of the locally generated terahertz oscillation in the detector which did not include the phase drift, and the modified terahertz signal created by the modified terahertz beam which did include the phase drift, was producing inconsistent interference patterns. Applicant recognizes that a 1×2 phase modulator arranged in the optical circuit as shown in transceiver system 150 can provide the phase drift to both the source PCS and detector PCS. By providing the phase drift to both the source PCS and detector PCS, the phase drift is common mode and is rejected. This common mode phase drift rejection occurs because the phase drift is present in both the modified terahertz signal created by the modified terahertz beam and the locally generated terahertz oscillation in the detector. Therefore, when these signals are homodyne mixed in the detector PCS, the phase drift is common to both signals and is substantially or completely eliminated.

Common mode phase drift rejection allows the transceiver system to be used for multiple scans for determining background spectrum noise information and for multiple scans for terahertz frequency spectral characteristic data. Multiple background spectrum scans can be averaged to determine an accurate reading of background spectrum noise which can then be subtracted from data scans to provide accurate information regarding a given scanned sample.

Figure 4:
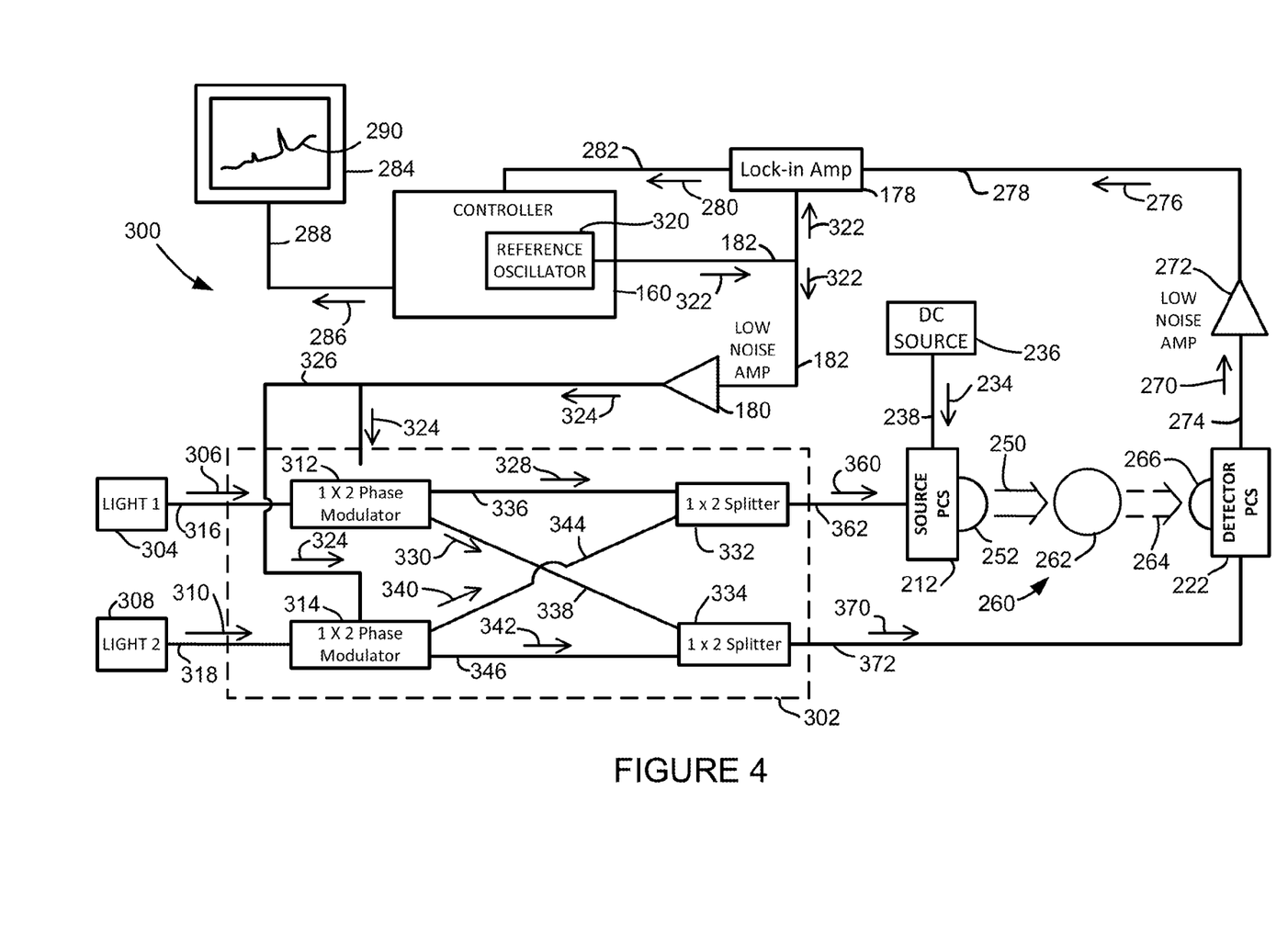
FIG. 4 is a diagrammatic illustration of another embodiment of a transceiver system with a common mode phase drift rejection configuration in accordance with the present disclosure.

Referring now to FIG. 4, another embodiment of a transceiver system which utilizes common mode phase drift rejection is shown and is indicated by reference number 300. Like components of transceiver system 300 and transceiver system 150 may be referenced using like reference numbers. Transceiver system 300 includes an optical circuit 302 which is arranged such that phase drift is supplied to both the source PCS and detector PCS so that the phase drift can be common mode rejected in the manner described in conjunction with transceiver system 150 in FIG. 3. Transceiver system 300 includes a first light source 304 which can generate a first light 306, and a second light source 308 which can generate a second light 310. The first and second lights can be generated to have a difference frequency in the terahertz frequency range. First and second light sources can be controlled to vary one or both of the first and second light wavelengths using controller 160 in order to create various different terahertz frequencies for use by the transceiver system.

Transceiver system 300 includes a first 1×2 phase modulator 312 and a second 1×2 phase modulator 314. Phase modulator 312 receives the first light through a waveguide 316 and phase modulator 314 receives the second light through a waveguide 318. A reference oscillator 320 generates an oscillator signal 322 and supplies the oscillator signal to lock-in amplifier 178 and low noise amplifier 180 through reference oscillator conductor 182. The low noise amplifier amplifies the oscillator signal to create a phase modulator control signal 324 at a modulation frequency that is the same as the oscillator signal and which is supplied to the phase modulators over a control line 326. Phase modulator control signal 324 can be low frequency, as described above, and the control signal controls the phase modulators such that the relative phase between the first and second lights is modulated.

First phase modulator 312 receives first light 306 and modulates the phase of the first light relative to second light 310 to create a phase modulated first light 328. First phase modulator 312 also produces an unmodulated phase modulator first light 330. First phase modulator 312 supplies phase modulated first light 328 to a 1×2 splitter 332 through a waveguide 336 and supplies unmodulated phase modulator first light 330 to a 1×2 splitter 334 over a waveguide 338. Both phase modulated first light 328 and unmodulated phase modulator first light 330 include unwanted phase drift introduced by phase modulator 312.

Second phase modulator 314 receives second light 310 and modulates the phase of the second light relative to first light 306 to create a phase modulated second light 340. Second phase modulator 314 also produces an unmodulated phase modulator second light 342. Second phase modulator 314 supplies phase modulated second light 340 to 1×2 splitter 332 over a waveguide 344 and supplies unmodulated phase modulator second light 342 to 1×2 splitter 334 over a waveguide 346.

Splitter 322 combines phase modulated first light 328 and phase modulated second light 340 to produce a combined light 360. Combined light 360 is supplied to source PCS 212 over a waveguide 362. Splitter 334 combines unmodulated phase modulator first light 330 and unmodulated phase modulator second light 342 to produce a combined light 370. Combined light 370 is supplied to detector PCS 222 over a waveguide 372. Combined light 360 and combined light 370 both contain the same phase drifts caused by the phase modulators. Since any phase drift created by the first and second phase modulators are supplied to both the source PCS and the detector PCS, transceiver system 300 provides common mode phase drift rejection.

Figure 5:
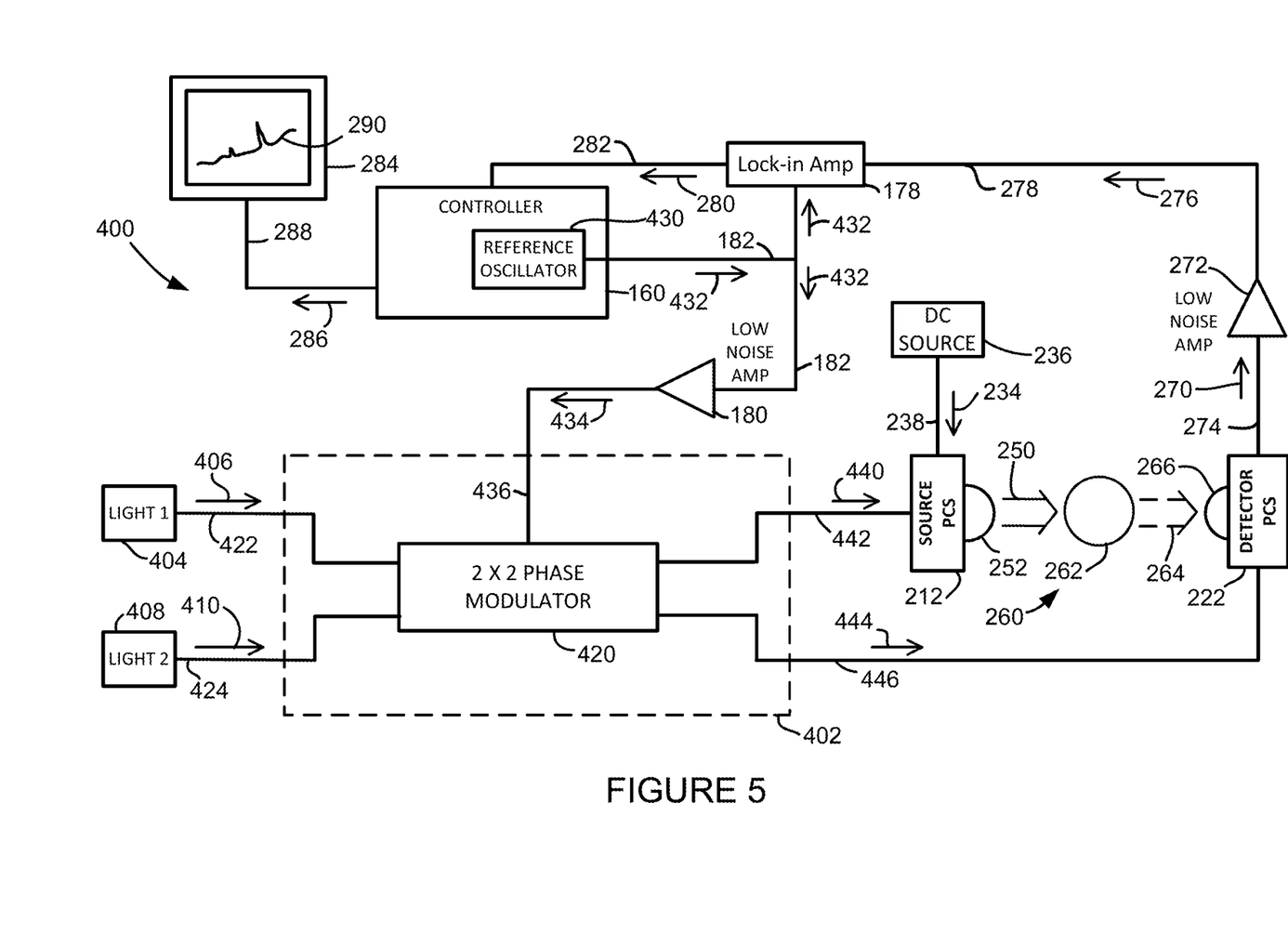
FIG. 5 is a diagrammatic illustration of yet another embodiment of a transceiver system with a common mode phase drift rejection configuration in accordance with the present disclosure.

Referring now to FIG. 5, another embodiment of a transceiver system which utilizes common mode phase drift rejection is shown and is indicated by reference number 400. Transceiver system 400 includes an optical circuit 402 which is arranged such that phase drift is supplied to both the source PCS and detector PCS for common mode rejection. Transceiver system 400 includes a first light source 404 which can generate a first light 406, and a second light source 408 which can generate a second light 410. First and second light sources 404 and 408 can be controlled to generate the respective lights such that the difference frequency is in the terahertz frequency range. The first and second light sources can be controlled using controller 160, or other suitable control arrangement, in order to create the various different terahertz frequencies for use by the transceiver system.

Transceiver system 400 includes a 2×2 phase modulator 420 which is connected to receive first light 406 through a waveguide 422 and to receive second light 410 through a waveguide 424. A reference oscillator 430 generates an oscillator signal 432 and supplies the oscillator signal to lock-in amplifier 178 and low noise amplifier 180 over oscillator conductor 182. The low noise amplifier amplifies the oscillator signal to create a phase modulator control signal 434 at a modulation frequency that is the same as the oscillator signal and which is supplied to phase modulator 420 over a control line 436. Phase modulator control signal 434 can be low frequency, as described above, and the control signal controls the phase modulator to modulate the phase of light 406 and light 410 at the modulation frequency.

Phase modulator 420 produces a phase modulated first light and a phase modulated second light and combines these lights to produce a combined phase modulated light 440 which is supplied to the source PCS through a waveguide 442. Phase modulator 420 also produces an unmodulated phase modulator first light and an unmodulated phase modulator second light and combines these lights to produce a combined phase modulator light 444 which is supplied to the detector PCS through a waveguide 446. As described previously, since any phase drift created by phase modulator 420 is supplied to both the source PCS and detector PCS, transceiver system 400 also provides common mode phase drift rejection.

Figure 6:
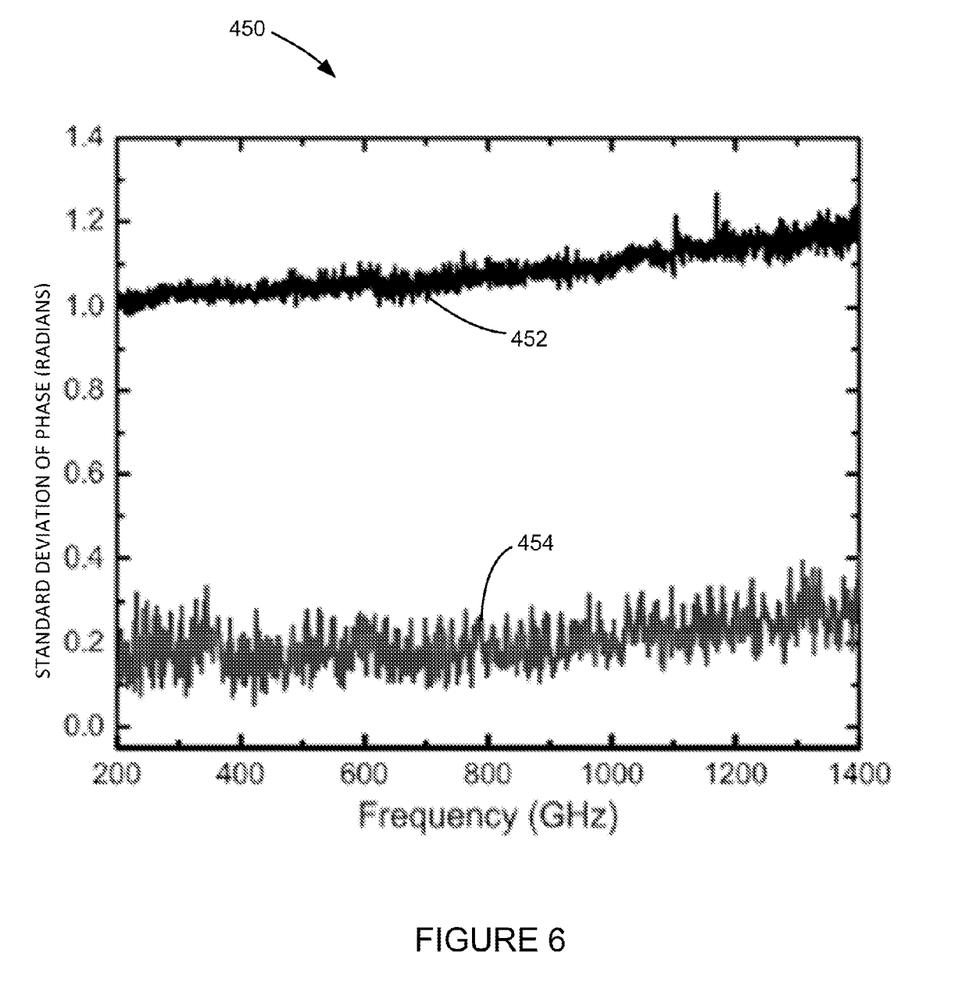
FIG. 6 is a graph having plots which illustrate different standard deviations in phase.

Referring now to FIG. 6, a graph 450 is shown which provides a comparison of a deviation in phase in radians with a system employing a 1×1 phase modulator that is not arranged to provide common mode phase drift rejection versus a 1×2 phase modulator that is arranged to provide common mode phase drift rejection. The comparison is over a frequency range of about 200 GHz to 1400 GHz. In graph 450 a plot line 452 indicates the standard deviation of phase in radians for a phase modulator with a 1×1 configuration. As can be seen by the graph, the standard deviation of phase for the 1×1 phase modulator is consistently over 1.0. By comparison, a plot line 454 indicates the standard deviation of phase in radians for a phase modulator with a 1×2 configuration utilized as shown in transceiver system 150 in FIG. 3. The standard deviation of phase in radians for the 1×2 phase modulator is approximately 0.2 at the lower frequencies in the range and 0.3 at the upper frequencies in the range. Graph 450 illustrates that an improvement factor of 5 in phase stability can be achieved by using a 1×2 phase modulator that is arranged to provide common mode phase drift rejection as compared to using a 1×1 phase modulator that is not so arranged. Although shown in gigahertz, it should be understood that this range can be referred to as a terahertz range as well. The range of 200 GHz to 1400 GHz can be useful in identifying many different materials and therefore the transceiver system can utilize frequencies within this range and can sweep the terahertz radiation beam through this range or through a portion thereof.

The light sources can be lasers and can have an optical wavelength from about 760 nm to about 1550 nm. Lasers having wavelengths around 1550 nm can be relatively inexpensive while lasers having wavelengths around 760 nm can be relatively expensive. The shorter wavelength lasers can be temperature tuned further than the longer wavelength lasers. Also, PCSs that operate at frequencies around 1550 nm are not common and can be difficult to manufacture as compared to PCSs that operate at shorter wavelengths. Lasers having a wavelength of about 855 nm have been found to be more economical that 760 nm lasers, to work well with Low Temperature Grown GaAs PCSs, and to have good temperature tuning capabilities.

The spectrometer transceivers can utilize frequencies in the range of about 10 MHz to about 10 THz. This frequency range can be useful for measuring rotational or vibrational absorptions in materials and is complementary to Fourier Transform Infrared Spectrometers that generally utilize a frequency range greater than about 10 THz. This range can also be used in transceivers for measuring the thickness of a sample or changes in an effective thickness of a sample. Changes in the composition of a reaction can be determined because as the reaction occurs, the dielectric constant can change so the effective path length changes. A thickness of a sample can be determined, even though the dielectric remains unchanged as the thickness changes, the recorded spectrum does change. Transceivers can use frequencies in the 10 MHz to 10 THz range to transmit high speed data by encoding the data into the phase modulation.

In an embodiment, the phase modulator can be a 1×2 LiNbO3 fiber optic phase modulator for operation at 785 nm to allow the simultaneous modulation of the relative optical phases between the source and detector PCSs. The source PCS can be biased to a constant voltage such as 20 V DC, for example, and a low frequency phase modulator control signal can be applied to the phase modulator, such as a 6 kHz triangle wave. The amplitude of the low frequency control signal to control the bias of the phase modulator can be chosen such that the phase is modulated between 0 and 180° or between 0 and 90°, as examples.

Although the 1×2 and 2×2 phase modulators can reduce optical power levels compared to 1×1 phase modulators, the signal levels have been empirically demonstrated by Applicant as effective for use in spectrometers. An embodiment of a common mode phase drift transceiver system can utilize electromagnetic radiation with a longer wavelength, such as 1550 nm, to reduce losses in the system. Use of the longer wavelength allows for less strict tolerances in optical connections and can decrease the optical losses in the optical connections. The first and second lasers can generate light in the visible, infrared and or ultra-violet wavelengths and different wavelengths can be used. The term light should not be limited to meaning only visible light.

Figure 7:
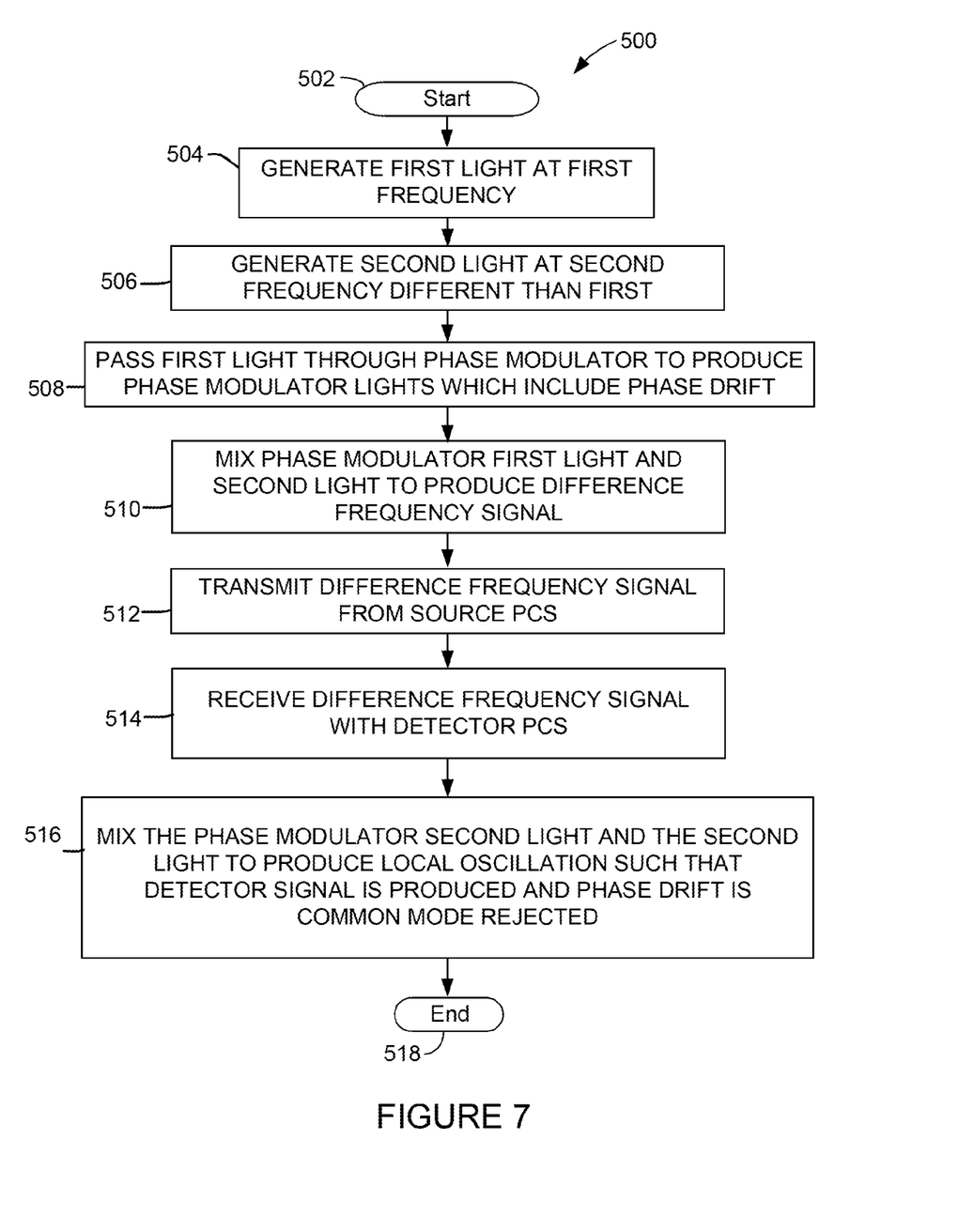
FIG. 7 is a method for common mode phase drift rejection in a transceiver having a phase modulator.

Referring now to FIG. 7, a method 500 is shown for common mode phase drift rejection in a transceiver having a phase modulator. Method 500 begins at a start 502 and proceeds to 504 where a first light is generated at a first frequency. The method then proceeds to 506 where a light is generated at a second frequency such that the first frequency and second frequency are different from one another by a difference frequency. The method then proceeds to 508 where the first light is passed through the phase modulator to produce a phase modulator first light and a phase modulator second light, the phase modulator introduces a phase drift into the phase modulator lights. The method then proceeds to 510 where the phase modulator first light and the second light are mixed at a source photoconductive switch to produce a difference frequency signal at the difference frequency. The method then proceeds to 512 where the difference frequency signal is transmitted from the source photo conductive switch. The method then proceeds to 514 where the difference frequency signal is received with a detector photo-conductive switch. The method then proceeds to 516 where the phase modulator second light and the second light are mixed at the detector photoconductive switch to produce a local oscillation in the detector photoconductive switch at the difference frequency such that the detector photoconductive switch produces a detector signal in response to the received difference frequency signal and the local oscillation. The mixing of the phase modulator first light having the phase drift with the second light at the source photoconductive switch and the phase modulator second light having the phase drift with the second light at the detector photoconductive switch produces the detector signal such that the phase drift is common mode rejected. The method then proceeds to 518 where the method ends.

Figure 8:
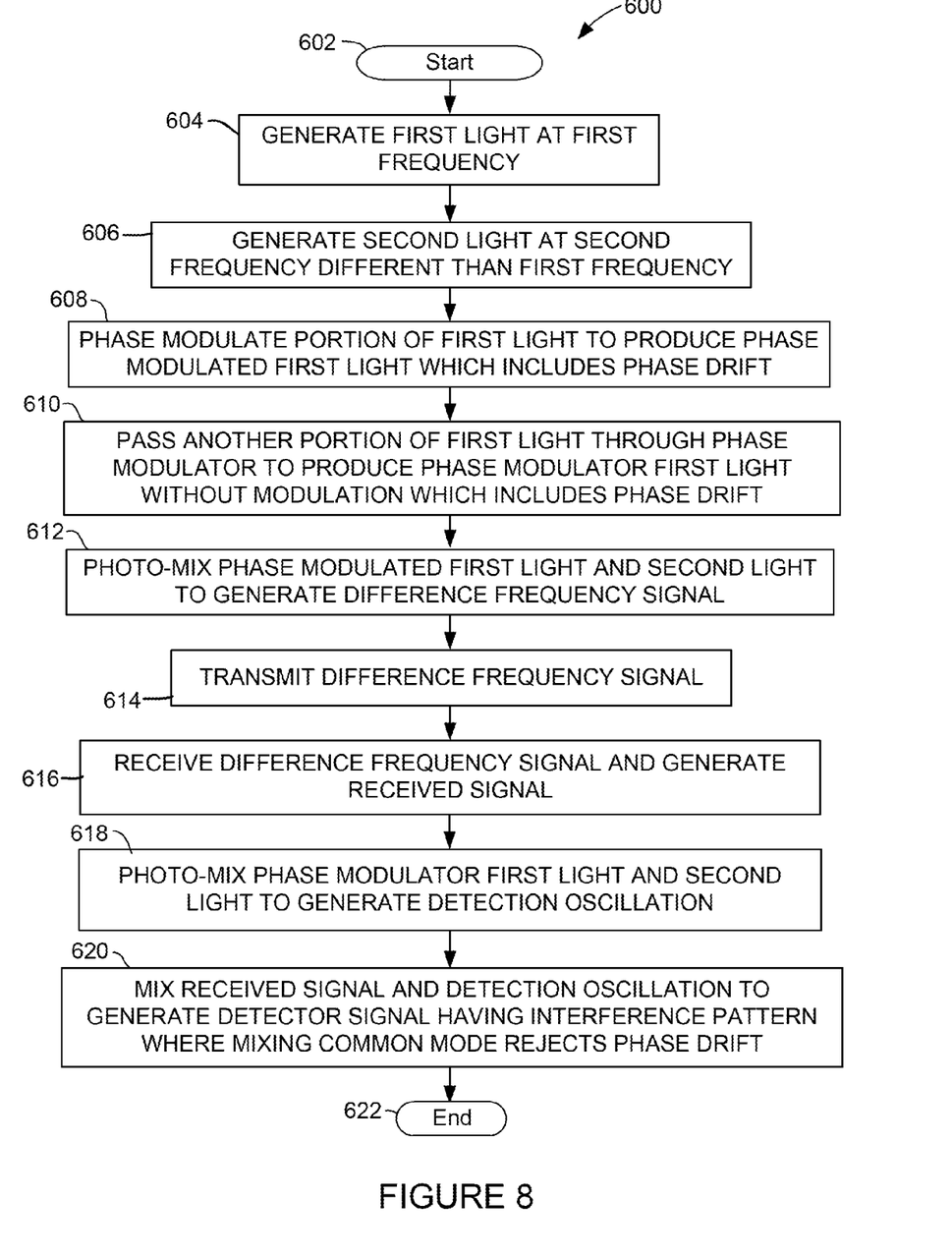
FIG. 8 is a method for increasing consistency of photo-mixing interference patterns in a transceiver system.

Referring now to FIG. 8, a method 600 is shown for increasing consistency of photo-mixing interference patterns in a transceiver system. Method 600 begins at 602 and proceeds to 604 where a first light is generated at a first frequency. The method then proceeds to 606 where a second light is generated at a second frequency such that the first frequency and second frequency are different from one another by a difference frequency. The method then proceeds to 608 where the phase of a portion of the first light is modulated relative to the second light using a phase modulator to produce a phase modulated first light, the phase modulator introducing a phase drift into the phase modulated first light. The method then proceeds to 610 where another portion of the first light is passed through the phase modulator to produce a phase modulator first light without phase modulation, the phase modulator introducing the phase drift into the phase modulator first light. The method then proceeds to 612 where the phase modulated first light and the second light are photo-mixed to generate a difference frequency signal at the difference frequency based at least in part on the photo-mixing. The method then proceeds to 614 where the difference frequency signal is transmitted. The method then proceeds to 616 where the difference frequency signal is received and a received signal is generated in response. The method then proceeds to 618 where the phase modulator first light and the second light are photo-mixed to generate a detection oscillation. The method then proceeds to 620 where the received signal and the detection oscillation are mixed to generate a detector signal. The detector signal includes an interference pattern resulting from photo-mixing and the mixing of the received signal and the detection oscillation common mode reject the phase drift introduced by the phase modulator. The method then proceeds to 622 where the method ends.

Various embodiments of systems and techniques are disclosed herein in which a transceiver system utilizes common mode phase drift rejection. Common mode phase drift rejection can reduce or eliminate phase drift related problems, such as inconsistent interference patterns, from a transceiver system. A transceiver system utilizing common mode phase drift rejection can have more consistent interference patterns which, in the case of spectrometry, allows for multiple background spectrum and sample scans to be used. Although shown and discussed in conjunction with transceivers configured for use as spectrometers, other transceivers using phase modulators that introduce phase drift can also benefit from the common mode phase drift rejection techniques and systems described herein. Applicants submit that apparatus, systems and methods according to the present disclosure provide sweeping and heretofore unseen benefits that are not recognized by the prior art.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for common mode phase drift rejection in a transceiver having a phase modulator, said method comprising:
   generating a first light at a first frequency;
   generating a second light at a second frequency such that the first frequency and second frequency are different from one another by a difference frequency;
   passing the first light through the phase modulator to produce a phase modulator first light and a phase modulator second light, the phase modulator introducing a phase drift into the phase modulator first light and the phase modulator second light;
   mixing the phase modulator first light and the second light at a source photoconductive switch to produce a difference frequency signal at the difference frequency;
   transmitting the difference frequency signal from the source photoconductive switch;
   receiving the difference frequency signal with a detector photoconductive switch; and
   mixing the phase modulator second light and the second light at the detector photoconductive switch to produce a local oscillation in the detector photoconductive switch at the difference frequency such that the detector photoconductive switch produces a detector signal in response to the received difference frequency signal and the local oscillation, and wherein mixing the phase modulator first light having the phase drift with the second light at the source photoconductive switch and the phase modulator second light having the phase drift with the second light at the detector photoconductive switch produces the detector signal such that the phase drift is common mode rejected.

2. The method as defined in claim 1 wherein the phase modulator first light mixed with the second light at the source photoconductive switch is modulated by the phase modulator and the phase modulator second light mixed with the second light at the detector photoconductive switch is not phase modulated by the phase modulator.

3. The method as defined in claim 2 wherein the phase modulator first light is phase modulated at a phase modulation frequency.

4. The method as defined in claim 2 wherein the phase modulator first light is phase modulated by a data stream.

5. The method as defined in claim 1 wherein the phase modulator first light is phase offset by the phase modulator with respect to the second light.

6. The method as defined in claim 1 wherein one of the first and second lights is generated with a wavelength of at least approximately 1550 nm.

7. The method as defined in claim 1 wherein one of the first and second lights is generated with a wavelength of at least approximately 785 nm.

8. The method as defined in claim 1 wherein one of the first and second lights is generated with a wavelength of at least approximately 855 nm.

9. The method as defined in claim 1 wherein the difference frequency signal is transmitted as a beam of electromagnetic radiation.

10. The method as defined in claim 9 wherein the beam of electromagnetic radiation is transmitted through a sampling area before reception by the detector photoconductive switch.

11. The method as defined in claim 1 wherein the source photoconductive switch transmits the difference frequency signal using a source antenna.

12. The method as defined in claim 1 wherein the detector photoconductive switch receives the difference frequency signal using a detector antenna.

13. The method as defined in claim 1 wherein the first and second lights are generated such that the difference frequency signal is in a range from about 10 MHz to about 10 THz.

14. A transceiver comprising:
   a first light source for generating a first light at a first frequency;
   a second light source for generating a second light at a second frequency such that the second frequency is different from the first frequency by a difference frequency;
   a phase modulator configured to receive the first light and to produce a phase modulator first light and a phase modulator second light, the phase modulator introducing a phase drift into each of the phase modulator first light and the phase modulator second light;
   a source photoconductive switch arranged to receive the phase modulator first light and the second light to produce and transmit a difference frequency signal having a frequency at the difference frequency;
   a detector photoconductive switch arranged to receive the phase modulator second light and the second light to produce a local oscillation at the difference frequency, the detector photoconductive switch also arranged to receive the difference frequency signal and to produce a detector signal in response to the received difference frequency signal and the local oscillation such that the difference frequency signal and the local oscillation include the phase drift to common mode reject the phase drift from the detector signal.

15. The transceiver as defined in claim 14 wherein the phase modulator is configured to phase modulate the phase modulator first light and to pass the phase modulator second light without phase modulation.

16. The transceiver as defined in claim 15 wherein the phase modulator is configured to phase modulate the phase modulator first light at a phase modulation frequency.

17. The transceiver as defined in claim 15 wherein the phase modulator is configured to phase modulate the phase modulator first light with a data stream.

18. The transceiver as defined in claim 14 wherein the phase modulator is configured to phase offset the phase modulator first light with respect to the phase modulator second light without offsetting the phase of the phase modulator second light.

19. The transceiver as defined in claim 14 wherein the aforesaid phase modulator is a first phase modulator and the aforesaid phase modulator first light is a first phase modulator first light and the aforesaid phase modulator second light is a first phase modulator second light, the transceiver further comprising:
   a second phase modulator configured to receive the second light and to produce a second phase modulator first light and a second phase modulator second light, wherein the aforesaid phase drift is a first phase drift and the second phase modulator introducing a second phase drift into each of the second phase modulator first light and the second phase modulator second light, and wherein the aforesaid second light received by the source photoconductive switch is the second phase modulator first light and the aforesaid second light received by the detector photoconductive switch is the second phase modulator second light.

20. The transceiver as defined in claim 19 wherein the second phase modulator first light is phase modulated by the second phase modulator with respect to the second phase modulator second light.

21. The transceiver as defined in claim 19 wherein the first and second phase modulators are each configured as a 2×2 phase modulator.

22. The transceiver as defined in claim 14 wherein the source photoconductive switch and detector photoconductive switch are configured and arranged for spectrometry.

23. The transceiver as defined in claim 14 wherein the source photoconductive switch and detector photoconductive switch are configured and arranged for communications.

24. The transceiver as defined in claim 14 wherein the source photoconductive switch and detector photoconductive switch are configured and arranged for imaging.

25. The transceiver as defined in claim 14 wherein the phase modulator is a 1×2 phase modulator.

26. The transceiver as defined in claim 14 wherein the phase modulator is a 2×2 phase modulator.

27. The transceiver as defined in claim 14 wherein one of the first and second light sources generates light with a wavelength of at least approximately 1550 nm.

28. The transceiver as defined in claim 14 wherein the source photoconductive switch is configured to transmit the difference frequency signal as a beam of electromagnetic radiation.

29. The transceiver as defined in claim 28 wherein the source photoconductive switch is arranged to transmit the difference frequency signal through a sampling area and the detector photoconductive switch is arranged to receive the difference frequency signal as the beam of electromagnetic radiation from the sampling area.

30. The transceiver as defined in claim 14 wherein the first and second light sources are configured for generating the first and second light such that the difference frequency is in a range of about 10 MHz to about 10 THz.

31. The transceiver as defined in claim 14, further comprising:
  a controller connected to at least one of the first and second light sources and configured for controlling the controller connected light source such that the difference frequency changes over a time period.

32. The transceiver as defined in claim 31, wherein the controller is configured to control the light source such that the difference frequency is swept through a series of frequencies over a time period.

33. A terahertz frequency spectrometer for performing spectroscopy on a sample in a sampling area, said spectrometer comprising:
  a first laser light source configured for generating a first laser light at a first frequency;
  a second laser light source for generating a second laser light at a second frequency, wherein the first and second laser lights are generated such that the first frequency and second frequency are different from one another by a difference frequency;
  a phase modulator configured for receiving the first laser light from the first laser light source and for producing a phase modulated laser light, that is phase modulated, and a phase modulator laser light, that is not phase modulated, the phase modulator introducing a phase drift component into the phase modulated light and the phase modulator light;
  a source photoconductive switch configured for receiving the phase modulated laser light and the second laser light for mixing to produce a beam of electromagnetic energy at the difference frequency in a direction toward the sample area; and
  a detector photoconductive switch arranged for receiving the phase modulator laser light and the second laser light to produce a local oscillation at the difference frequency in response thereto, the detector photoconductive switch also arranged to receive at least a portion of the electromagnetic energy from the sample area as influenced by the sample and to produce a received signal that is related to the received electromagnetic energy, the detector photoconductive switch also arranged to mix the local oscillation and the received signal to produce a detector signal that is related to the difference between the local oscillation and the received signal and which includes information related to the sample such that the phase drift component is present in the local oscillation and the received signal at least partially remove the phase drift by common mode rejection when the local oscillation and the received signal are mixed to produce the detector signal.

34. A method for increasing consistency of photo-mixing interference patterns in a transceiver system, comprising:
  generating a first light at a first frequency;
  generating a second light at a second frequency such that the first frequency and second frequency are different from one another by a difference frequency;
  modulating the phase of a portion of the first light relative to the second light using a phase modulator to produce a phase modulated first light, the phase modulator introducing a phase drift into the phase modulated first light;
  passing another portion of the first light through the phase modulator to produce a phase modulator first light without phase modulation, the phase modulator introducing the phase drift into the phase modulator first light;
  photo-mixing the phase modulated first light and the second light and generating a difference frequency signal at the difference frequency based at least in part on the photo-mixing;
  transmitting the difference frequency signal;
  receiving the difference frequency signal and generating a received signal in response;
  photo-mixing the phase modulator first light and the second light to generate a detection oscillation; and
  mixing the received signal and the detection oscillation to generate a detector signal, the detector signal including an interference pattern resulting from photo-mixing, and wherein the mixing of the received signal and the detection oscillation common mode reject the phase drift introduced by the phase modulator.

* * * * *